Figure 1:
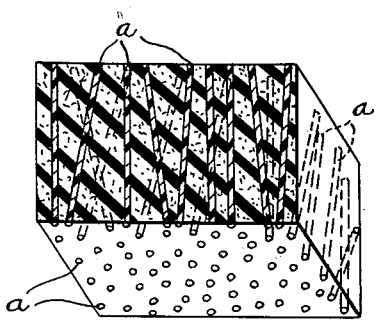

Jan. 14, 1958 — T. G. GREGORY — 2,819,994
POROUS AND FOAMY SPONGELIKE MATERIALS
Filed July 22, 1955

INVENTOR.

United States Patent Office 2,819,994
Patented Jan. 14, 1958

2,819,994

POROUS AND FOAMY SPONGELIKE MATERIALS

Thurlow G. Gregory, Cleveland Heights, Ohio

Application July 22, 1955, Serial No. 523,695

1 Claim. (Cl. 154—54)

This invention relates to an improvement in the wearing properties of the soft, elastic foamy and porous substances of which the commonly known sponge rubbers and plastic sponges are examples and the method of embodying this invention within such substances. By plastic sponges I mean soft and porous or foamy masses with body material consisting of a substance with physical properties of the order of soft, elastic rubber.

All elastic foam rubbers and the like have the advantageous property of maintaining their elasticity and flexibility for long periods of time but all have the common disadvantage of breaking apart or separating relatively quickly while in use. This invention relates directly to positioning elastic, cord-like means within the body of the foamy or porous gas-expanded substances whereby, first, to allow great elasticity and flexibility of the dry or set foamy or porous mass and, secondly, to inhibit the breaking apart of the body material. All elastic sponge-like masses are formed by the inclusion of air or other gas within the mass while plastic whereby to form a froth. As is well known in the art, substances from which the frothy masses are made are of such surface tension when liquid that they have the power to froth. Therefore, when such terms as foamy and frothy and gas-expanded and other terms comparable thereto are employed herein and in the appended claims I mean the state of the substance at the time it is used and not as a functional step in this invention.

I have discovered that cord-like or braid-like elastic supports, preferably of the solid, elastic, rubber-like type positioned within the body of the soft, elastic, foamy or porous gas-expanded substance before the frothy or porous gas-expanded mass sets and then allow the expanded material to set upon and around the elastic strengthening means impart great strength and long life to such substances while at the same time allowing great elasticity and great flexibility to these masses.

As the purposes of use as well as the consistency of these soft, elastic, foamy and porous substances are so very different from the purposes and use and the consistency of the solid rubber of automobile tires, the results achieved by the elastic cords disclosed herein are very different from the results achieved by the unelastic cords in automobile tires and the like. In automobile tires, garden hose and the like the unelastic cords are to prevent stretching whereas the elastic cords in this invention are to allow stretching. Solid rubber will tolerate unelastic cords whereas foam rubber, plastic sponge and other similar foamy and porous materials will not withstand the long, unelastic cords such as are in automobile tires. By this I mean that the long, unelastic cords cannot be advantageously employed in the foam rubbers, plastic sponges and the like as these long, unelastic cords will not stretch and due further to the nature of the soft, foamy body material. Such long, unelastic cords cut through the soft, foamy or porous body material. This invention eliminates both of these highly undesirable conditions. Most substances from which the frothy matter is formed have greater tensile strength and greater breaking strength in the solid unfrothed state than do these same substances when they are in the frothed state. This is particularly true of the rubbers. Therefore, the body materials while in the solid or unfrothed state are excellent material for forming the strengthening elastic cords described herein because they have greater breaking strength than the froth formed from that same material and, furthermore, because the frothed matter bonds excellently thereto.

When I employ the words cords and elastic cords and rubber cords and long elastic means and such comparable terms herein, I wish it to be understood that these terms do not limit to twisted or braided cords but include solid and twisted and braided and round and oval and square and ribbon-like and tubular and knotted and crooked and even eccentric supporting means such as of the order of rick rack braid and all of these and other equivalent forms and shapes are contemplated in the terms rubber cord, elastic cord, long elastic supporting means and such other comparable expressions when employed in this specification and in the appended claim.

Most of these foamy or porous substances which are soft and elastic or spongy at normal room temperatures are, when in the plastic state at the time of frothing, by which I mean the liquid or tending to the liquid state due to the application of heat or due to the presence of a solvent, are of such character that before setting they will adhere to the elastic cords or strengthening means and during the advent of setting they will bond as a froth or porous mass onto the elastic cords or elastic supporting means described in this invention.

Figure 2:
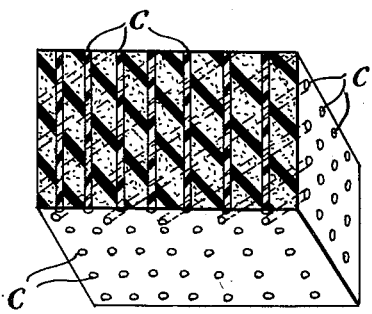
Figure 3:
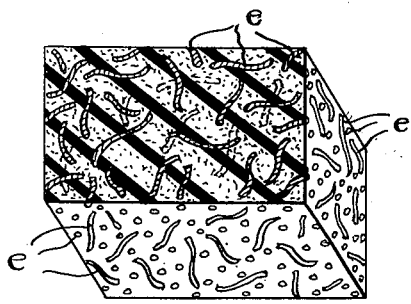

Figures 1, 2 and 3 show various forms of the invention both in perspective and in cross-section.

The elastic cords or elastic supporting means described in this invention may be positioned at random within the mass as shown at a in Fig. 1, or may extend lengthwise and crosswise as shown at c in Fig. 2 or be random as to sizes, shapes, lengths and positions as shown at e in Fig. 3, and these and all other equivalent forms which simple experimentation will show to be equivalent are contemplated in the terms elastic cords and long, elastic supporting means and the like when employed in this specification and in the appended claim. The distances separating the various elastic cords or elastic means within the mass are not critical and will vary depending upon the use to which any given lot of foamy or porous substances embodying this invention is to be put. The elastic cords and elastic supporting means preferably are embedded well within the body of the foamy or porous mass as is shown in Figure 3.

In the manufacture of foamy or porous masses embodying this invention the specific gravity of the elastic cords being similar to the specific gravity of the foamy or porous masses which usually set relatively quickly, the elastic cords can be positioned immediately or even agitated within the froth as continuous operations during production. When very high speed production is desired, is is preferable, but not essential, to employ elastic cords made of an elastic substance with a higher melting point than the melting point of the foamy or porous substance.

By porous I mean that a substantial part of the bubble-formed openings extend from the surface deeply within the body of the mass whereas by foamy I mean that most of the bubble formations are bubbles fully entrapped within the mass when dry.

The term rubber when used herein and in the appended claim embraces natural latex rubber, GR–S rubber which is the co-polymerisation of butadiene and styrene as well as other rubbers which simple experimentation by those skilled in the art will show to be equivalents for the purposes of this invention. By solid rubber I mean elastic rubber which does not contain appreciable foam. When the words "gas-expanded mass" and the like are employed herein and in the appended claim they are intended to include foamy masses and also porous masses as well as masses that are both foamy and porous.

By the term long, elastic supporting means I mean having length in contradistinction to pellets or balls or blocks or slugs or grains or the like.

The subject matter of this application is distinguished from that of my co-pending application filed concurrently herewith July 22, 1955, and bearing Serial Number 523,694 in that the strengthening elements in this present application are elastic whereas those in the co-pending application are unelastic.

Having described my invention, I claim:

An elastically re-enforced sponge rubber article, comprising a mass of sponge rubber having short lengths of independent, disconnected, randomly arranged rubber cords wholly embedded within and throughout so as to form an elastic means for re-enforcing the mass, whereby the respective cords may stretch independently as a group from end to end while still remaining embedded within the mass as it is stretched in any direction.

References Cited in the file of this patent

UNITED STATES PATENTS

| | | |
|---|---|---|
| 1,427,754 | Gibbons et al. | Aug. 29, 1922 |
| 1,884,106 | Moran | Oct. 25, 1932 |
| 2,140,063 | Talalay | Dec. 13, 1938 |
| 2,159,213 | Howard | May 23, 1939 |
| 2,273,313 | Clapp | Feb. 17, 1942 |
| 2,280,022 | Banigan et al. | Apr. 14, 1942 |
| 2,298,986 | Taylor et al. | Oct. 13, 1942 |
| 2,409,660 | Briggs | Oct. 22, 1946 |
| 2,719,795 | Nottebohm | Oct. 4, 1955 |
| 2,740,402 | Scholl | Apr. 3, 1956 |

FOREIGN PATENTS

| | | |
|---|---|---|
| 804,987 | France | Aug. 17, 1936 |

OTHER REFERENCES

Glass Fiber Reinforcement of Foam Rubber by Bailey Bennett et al. published in India Rubber World Sept. 1950 pages 672 and 673 and 710.